United States Patent
Yoon et al.

(10) Patent No.: US 10,880,758 B2
(45) Date of Patent: Dec. 29, 2020

(54) METHOD AND DEVICE FOR SHARING STATE RELATED INFORMATION

(71) Applicant: Samsung Electronics Co., Ltd., Suwon-si (KR)

(72) Inventors: Jaesik Yoon, Seoul (KR); Dongjin Lee, Suwon-si (KR); Changsung Lee, Uiwang-si (KR); Junyoung Cho, Suwon-si (KR); Jungah Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 15/776,528

(22) PCT Filed: Nov. 18, 2016

(86) PCT No.: PCT/KR2016/013347
§ 371 (c)(1),
(2) Date: May 16, 2018

(87) PCT Pub. No.: WO2017/086739
PCT Pub. Date: May 26, 2017

(65) Prior Publication Data
US 2018/0332483 A1 Nov. 15, 2018

(30) Foreign Application Priority Data
Nov. 20, 2015 (KR) .................. 10-2015-0163556

(51) Int. Cl.
*H04W 24/02* (2009.01)
*H04W 24/08* (2009.01)
(Continued)

(52) U.S. Cl.
CPC ............. *H04W 24/02* (2013.01); *H04L 5/006* (2013.01); *H04L 41/0816* (2013.01);
(Continued)

(58) Field of Classification Search
None
See application file for complete search history.

(56) References Cited

U.S. PATENT DOCUMENTS

| 6,070,052 A | 5/2000 | Ogasawara et al. |
| 6,353,902 B1 | 3/2002 | Kulatunge et al. |
(Continued)

FOREIGN PATENT DOCUMENTS

| CN | 101861744 A | 10/2010 |
| CN | 102948228 A | 2/2013 |
(Continued)

OTHER PUBLICATIONS

Chinese Office Action dated Aug. 18, 2020, issued in Chinese Patent Application No. 201680067656.2.

*Primary Examiner* — Faruk Hamza
*Assistant Examiner* — Cassandra L Decker
(74) *Attorney, Agent, or Firm* — Jefferson IP Law, LLP

(57) ABSTRACT

The present invention relates to method and device for sharing state related information among a plurality of electronic devices and, more particularly, to method and device for predicting the state of a device on the basis of information shared among a plurality of electronic devices. In order to attain the purpose, a method for sharing state related information of a device, according to an embodiment of the present invention, comprises the steps of: generating a state model of a device on the basis of state related data; selecting one or more parameters for determining the state of the device on the basis of the generated state model; and transmitting the one or more selected parameters to at least one other device.

13 Claims, 16 Drawing Sheets

(51) Int. Cl.
  *H04W 24/04* (2009.01)
  *H04L 5/00* (2006.01)
  *H04L 12/24* (2006.01)
  *H04W 16/18* (2009.01)

(52) U.S. Cl.
  CPC ........... *H04W 16/18* (2013.01); *H04W 24/04* (2013.01); *H04W 24/08* (2013.01)

(56) References Cited

U.S. PATENT DOCUMENTS

| | | | |
|---|---|---|---|
| 6,892,317 | B1 | 5/2005 | Sampath et al. |
| 7,130,805 | B2 | 10/2006 | Bergman et al. |
| 8,897,780 | B2 | 11/2014 | Lindoff et al. |
| 8,989,797 | B2 | 3/2015 | Yamazaki |
| 2004/0181712 | A1 | 9/2004 | Taniguchi et al. |
| 2005/0193281 | A1 | 9/2005 | Ide et al. |
| 2005/0254455 | A1* | 11/2005 | Plehn .................... H04W 16/18 370/328 |
| 2007/0268509 | A1 | 11/2007 | Andreoli et al. |
| 2009/0167520 | A1 | 7/2009 | Watanabe et al. |
| 2009/0170528 | A1 | 7/2009 | Bull et al. |
| 2011/0195742 | A1* | 8/2011 | Hosono ................. H04W 24/04 455/522 |
| 2011/0246561 | A1* | 10/2011 | Eshima ............... G06F 16/9535 709/203 |
| 2011/0300871 | A1* | 12/2011 | Dottling ................ H04W 24/02 455/446 |
| 2012/0176984 | A1 | 7/2012 | Susitaival et al. |
| 2012/0252440 | A1* | 10/2012 | Watanabe ............. H04W 24/02 455/423 |
| 2012/0307662 | A1 | 12/2012 | Puolakka et al. |
| 2013/0109373 | A1 | 5/2013 | Watanabe |
| 2014/0112281 | A1 | 4/2014 | Lau et al. |
| 2015/0016434 | A1* | 1/2015 | Luo .................... H04W 72/082 370/336 |
| 2016/0057654 | A1* | 2/2016 | Backholm ......... H04W 52/0277 370/236 |

FOREIGN PATENT DOCUMENTS

| | | |
|---|---|---|
| DE | 102014205391 A1 | 9/2015 |
| WO | 2011/025434 A1 | 3/2011 |
| WO | 2015/144410 A1 | 10/2015 |

* cited by examiner

FIG. 5B

| BASE STATION | AREA | VERSION | TYPE | HEIGHT | FREQUENCY | CELL | GROUP |
|---|---|---|---|---|---|---|---|
| | | ⋮ | | | | | |
| A | 40 | 2.1.1 | 1 | 4 | 6 | 7 | GROUP 1 |
| B | 41 | 2.1.1 | 1 | 4 | 6 | 7 | |
| C | 43 | 2.1.0 | 1 | 4 | 7 | 9 | |
| D | 42 | 2.0.0 | 1 | 4 | 7 | 9 | |
| E | 43 | 2.2.0 | 1 | 3 | 7 | 9 | |
| F | 46 | 2.3.0 | 1 | 2 | 5 | 5 | GROUP 2 |
| G | 47 | 2.3.0 | 1 | 2 | 5 | 5 | |
| H | 47 | 2.4.0 | 1 | 2 | 5 | 5 | |
| I | 48 | 2.5.0 | 1 | 2 | 5 | 5 | |
| J | 50 | 2.4.1 | 1 | 1 | 5 | 5 | |
| K | 50 | 2.4.1 | 1 | 1 | 0 | 4 | |
| | | ⋮ | | | | | |

METHOD AND DEVICE FOR SHARING STATE RELATED INFORMATION

TECHNICAL FIELD

The present invention relates to a method and apparatus for sharing state information between a plurality of electronic devices, and more particularly, to a method and apparatus for predicting the state of a device based on information shared among multiple electronic devices.

BACKGROUND ART

Recently, with the increase of mobile communication devices and the use of big data and cloud computing technologies, traffic has been rapidly increasing. In this trend, low-latency, high-throughput and secure end-to-end communication has become important. At the same time, in particular, as the role of the base station system (BSS) equipment relaying such communication becomes important, there is an ongoing discussion on the analysis capability for continuous real-time resource allocation, performance optimization, stability, and the cause of anomalies. In general, to satisfy the requirements of a mobile communication service provider, values for quality of service (QoS), quality of experience (QoE), and service level agreement (SLA) are defined, and mobile communication devices are operated based on them.

In operating the mobile communication apparatus, the state prediction refers to predicting the software and hardware state of the apparatus in the future on the basis of the previous operational log information of the mobile communication apparatus. As a specific example, the states in the mobile communication apparatus may include the state of network resource distribution, the state of power usage, and the state of maintaining throughput connection.

For the state prediction of the performance apparatus, sensor data of various elements that can be extracted from the apparatus can be collected. For example, statistical analysis and machine learning techniques can be applied to the sensor data to predict the state of the apparatus. The sensor data can be classified into periodic data, event data, and configuration data according to the data collection approach. For example, the apparatus may collect periodic data by periodically recording information about elements extracted from software and hardware, such as temperature, power interference, and resource utilization. The apparatus may collect event data by, for example, configuring a situation where a certain element exceeds a preset threshold as an event. The apparatus may collect configuration data by recording information on the firmware version, location, and cell setup thereof.

FIGS. 1A and 1B illustrate the use of a prediction model for a particular state of the apparatus.

In FIG. 1A, to make a prediction on the state, the apparatus collects the data log during the learning period 100 and generates a prediction model 110 based on the collected data logs. Then, the apparatus predicts the state thereof during the state prediction period 120 by inputting data logs of a given period into the prediction model 110.

FIG. 1B shows a process of deriving a prediction result based on the internal structure of the apparatus making a prediction on the state using a prediction model. More specifically, after collecting data logs, the apparatus produces a prediction result through a learning stage in the modeling unit (MU) and a prediction stage in the prediction unit (PU). The modeling unit and the prediction unit are based on machine learning algorithms widely known in the art, and the machine learning algorithms include naive Bayesian networks, support vector machines, and random forests. The prediction accuracy according to the prediction results produced by the listed algorithms may be different depending on the characteristics and amount of the data logs.

Next, a description is given of the modeling unit and the prediction unit.

First, the modeling unit creates a model using data and data classes. The data may include raw data or processed data logs. In the present invention, the data and the data log can be interchangeably used. The data class refers to the desired output value for the data. For example, the data class may refer to the result values for data values belonging to a specific period in the past. The model is generated based on stochastic or deterministic patterns of data for the data class.

Next, after the model is generated, the prediction unit inputs a new data log to the model to produce an output value as a prediction result. That is, the prediction unit derives a data class for the new data log using a class decision rule of the model. The prediction unit also derives the prediction accuracy of the prediction result. The prediction accuracy can be different depending on the machine learning algorithm, the characteristics and quantity of data logs, the number of parameters, and the data processing precision. The prediction accuracy can be improved by using feature engineering or feature selection. In particular, it is possible to extract and learn various patterns as the number of learning data logs and the number of parameters increase, so that collecting and learning data logs of various parameters can improve the prediction accuracy. Feature engineering or feature selection arranging modeling, prediction, and data classes for a typical machine learning operation is a general technique in the field of the present invention and does not belong to the scope of the present invention, and a detailed description thereof will be omitted.

FIG. 2 illustrates a specific method of applying data learning and the prediction model.

More specifically, a description is given of a decentralized method and a centralized method, which are methods for, e.g., plural base stations that learn data and generate a prediction model to produce a prediction result.

In the decentralized method shown in part (a) of FIG. 2, each base station learns generated data independently to generate a prediction model, and performs data prediction based on the generated prediction model. Each base station also calculates the accuracy of the prediction model. That is, one base station does not transmit or receive a data log to or from another base station. In the centralized method shown in part (b) of FIG. 2, each base station transmits a data log generated thereat to the central server, which learns the collected data logs and generates a prediction model. The central server performs data prediction based on the prediction model and calculates the accuracy of the prediction model. That is, new data logs are also transmitted to the apparatus and the accuracy is calculated.

More specifically, in the decentralized method, each apparatus learns and predicts using independently collected data logs. This makes it possible to create a prediction model by taking into consideration the characteristics of each apparatus, but it is necessary to accumulate data logs for a long period of time for practical use. In addition, since a model can be generated by having information on the output value for a data log (i.e., data class), the state prediction for a newly installed apparatus may be impossible because there are no accumulated data logs.

In the centralized method, the central server can collect a large amount of data logs from various base stations and reach a high prediction accuracy by using recently introduced big data technology. However, if the amount of data increases according to a specific learning algorithm, more resources are needed for learning. In addition, the CPU, memory, and disk capacity requirements of the central server increase; the learning time becomes long; it is difficult to transmit the prediction result in real time; and it is difficult to reflect characteristics of each base station in the prediction model.

DISCLOSURE OF INVENTION

Technical Problem

The present invention has been made in view of the above problems. Accordingly, an aspect of the present invention is to provide a method for sharing state related information including parameters selected based on a device state model between different devices having similar characteristics.

Solution to Problem

In accordance with an aspect of the present invention, there is provided a method of sharing state related information for a device. The method may include: generating a state model of the device on the basis of state related data; selecting at least one parameter determining the state of the device based on the generated state model; and transmitting the selected at least one parameter to at least one different device.

In accordance with another aspect of the present invention, there is provided a device capable of sharing state related information. The device may include: a transceiver unit configured to transmit and receive a signal; and a controller configured to control generating a state model of the device on the basis of state related data, selecting at least one parameter determining the state of the device based on the generated state model, and transmitting the selected at least one parameter to at least one different device.

Advantageous Effects of Invention

In a feature of the present invention, state related information including parameters selected based on the state model, other than the entire data logs, is shared among different devices having similar characteristics. Hence, it is possible to use a small amount of resources among the devices. Each device can make a prediction even if a specific state to be predicted at the present time point has not occurred in the past. A high prediction accuracy can be achieved by learning a small amount of data logs. In addition, one device can combine the state related information received from another device with the state model generated by it to produce a prediction result. Hence, each device can obtain a prediction result in real time in consideration of the characteristics of the device.

BRIEF DESCRIPTION OF DRAWINGS

FIGS. 5A and 5B illustrate grouping of devices to share state related information according to an embodiment of the present invention.

MODE FOR THE INVENTION

Figure 1A:
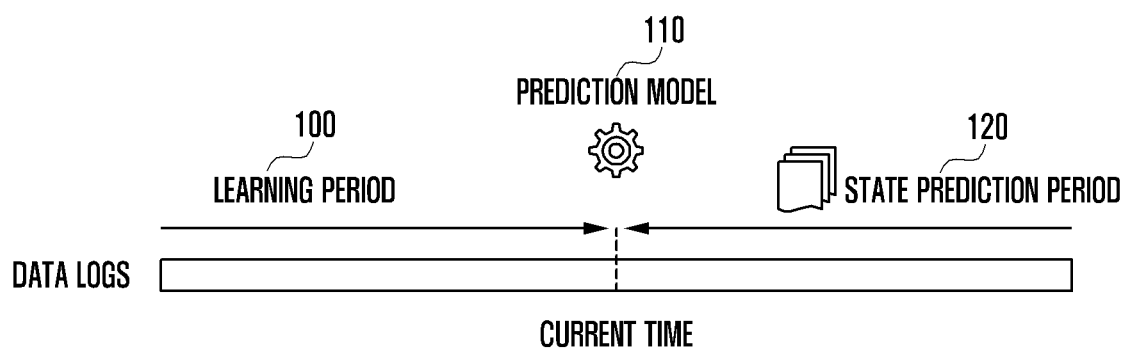
FIGS. 1A and 1B illustrate the use of a prediction model for a particular state of the apparatus.
Figure 1B:
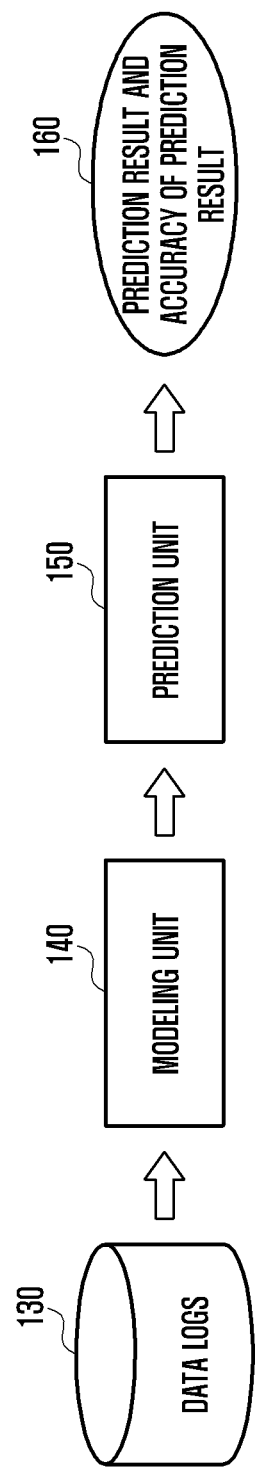
Figure 2:
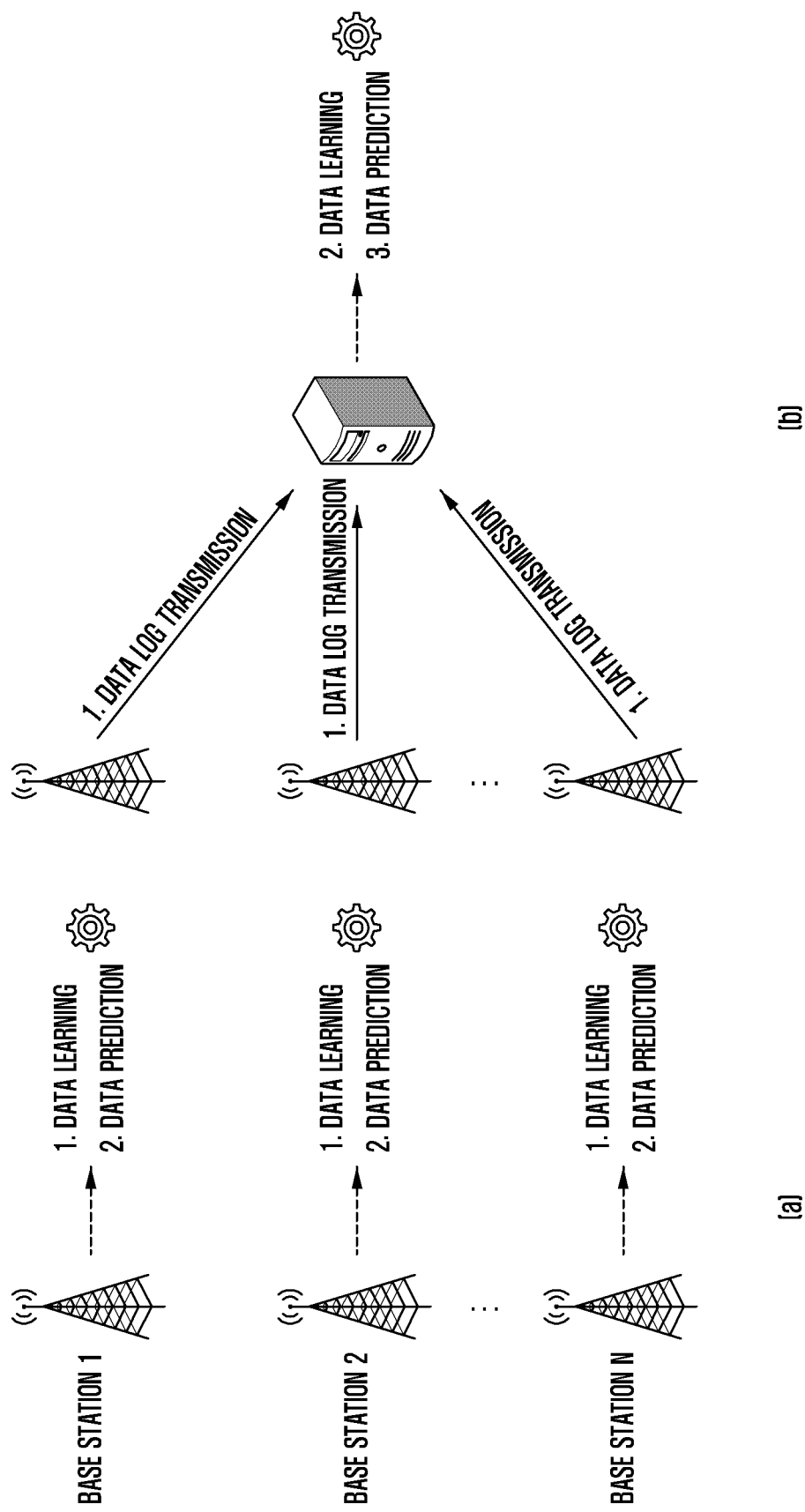
FIG. 2 illustrates a specific method of applying data learning and the prediction model.

Hereinafter, preferred embodiments of the present invention are described in detail with reference to the accompanying drawings. The same or similar reference symbols are used throughout the drawings to refer to the same or like parts. Descriptions of well-known functions and constructions may be omitted to avoid obscuring the subject matter of the present invention.

Hereinafter, preferred embodiments of the present invention are described in detail with reference to the accompanying drawings. The same or similar reference symbols are used throughout the drawings to refer to the same or like parts. Descriptions of well-known functions and constructions may be omitted to avoid obscuring the subject matter of the present invention.

The following description is focused on 4G communication systems including the advanced E-UTRA (or LTE-A) system supporting carrier aggregation. However, it should be understood by those skilled in the art that the subject matter of the present invention is applicable to other communication systems having similar technical backgrounds and channel configurations without significant modifications departing from the scope of the present invention. For example, the subject matter of the present invention is applicable to multicarrier HSPA systems supporting carrier aggregation and next generation 5G communication systems.

Descriptions of functions and structures well known in the art and not directly related to the present invention may also be omitted for clarity and conciseness without obscuring the subject matter of the present invention.

In the drawings, some elements are exaggerated, omitted, or only outlined in brief, and thus may be not drawn to scale. The same or similar reference symbols are used throughout the drawings to refer to the same or like parts.

The aspects, features and advantages of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

In the description, the "state model" is generated by learning various data logs in the past that determine the state of the device, such as the resource usage state or the power usage state. The state model may output a prediction result for the state of the device in the future when a certain amount or more of data logs is input.

In the description, the "state related information" refers to information on the factors that determine the state (e.g., software state or hardware state) of the device. The state related information may be derived from the state model generated based on the learning data for the state. The state related information may include at least one parameter determining the state, and may further include weight information indicating the extent to which the parameters determine the state.

In the description, the "model related information" may include information regarding the characteristics of data logs, the algorithm, and the parameters used to generate the state model in the device, or information on the accuracy of the state model.

Figure 3:
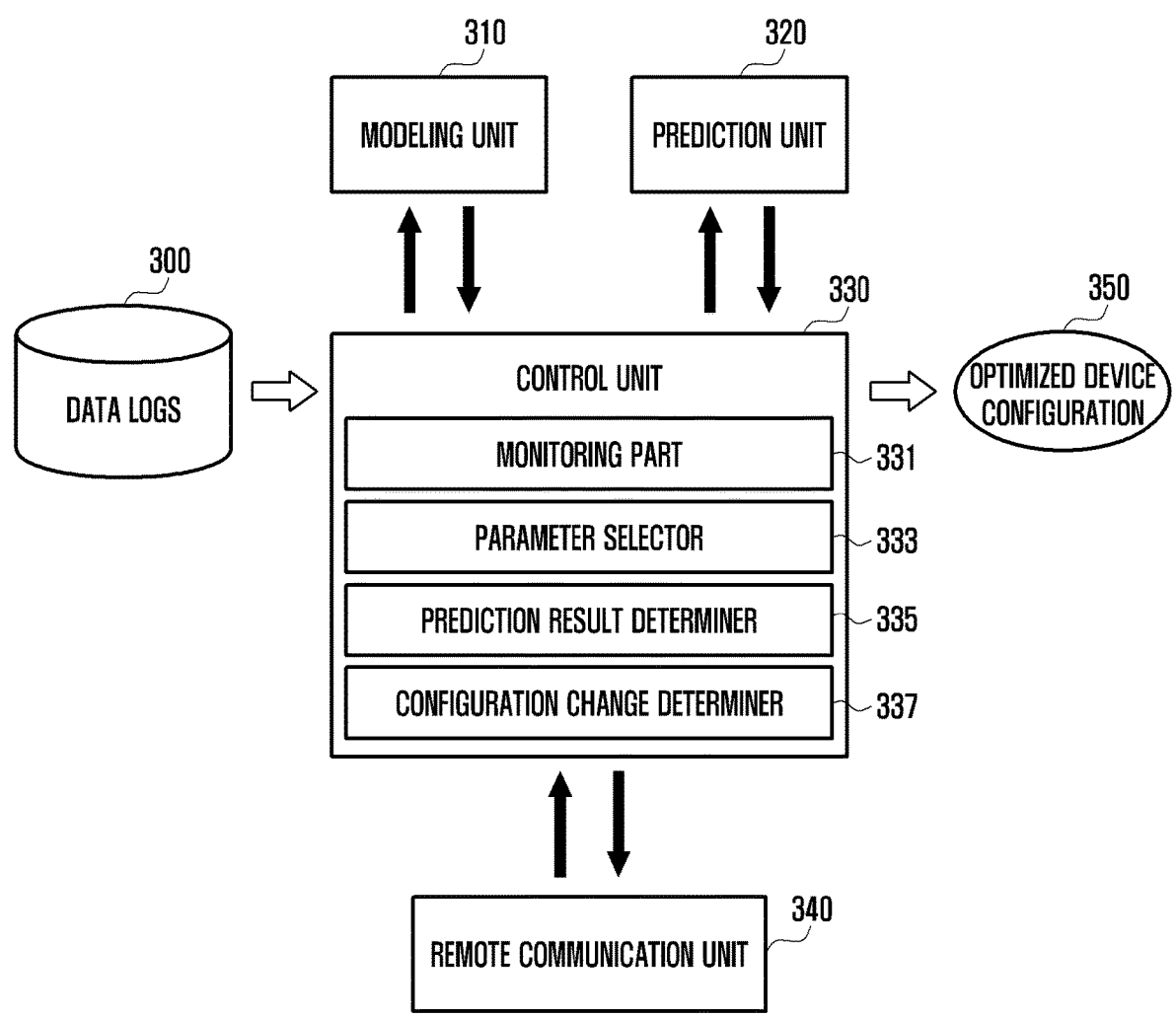
FIG. 3 is a block diagram illustrating the internal structure and operation of a device according to an embodiment of the present invention.

FIG. 3 is a block diagram illustrating the internal structure and operation of a device according to an embodiment of the present invention.

More specifically, the device may include a modeling unit 310, a prediction unit 320, a control unit 330, and a remote communication unit 340. The data log 300 can be input to the device and optimized device configuration information 350 can be output. That is, it can be seen that the control unit 330 is newly added to the existing prediction model approach. Hereinafter, to distinguish the device from a different or external device that exchanges information with the device through the remote communication unit, the device including the control unit 330 is referred to as a local device, and the other device is referred to as a remote device.

The modeling unit 310 may learn data logs from the control unit 330 to generate the state model of the local device. In this case, the modeling unit 310 can generate the state model of the local device using state related information and model related information received through the remote communication unit 340 from the remote device.

The prediction unit 320 may produce a prediction result for each state model on the basis of a preset amount or more of data logs and at least one state model from the control unit 330. That is, the prediction unit 320 may input received data logs to the state model generated in the local device and the state model generated in the remote device to produce prediction results for each state model.

The control unit 330 may cause the modeling unit 310 and the prediction unit 320 to work together and exchange information with the remote devices through the remote communication unit 340. That is, the control unit 330 can act as an integrator for state prediction in the device. Specifically, the control unit 330 may include a monitoring part 331, a parameter selector 333, a prediction result determiner 335, and a configuration change determiner 337.

The monitoring part 331 collectively manages the interfaces between the internal modules of the control unit 330 and may continuously monitor the status of the local device. The monitoring part 331 may store data logs 300 obtained from the sensors attached to the local device and may store the state model received from the modeling unit 310. The state model may include state related information determining the state, and may be composed of parameters and weighting information for the parameters. For example, the state model may include information on the parameters, arranged in order of weight, which determine the state of the device.

Figure 7:
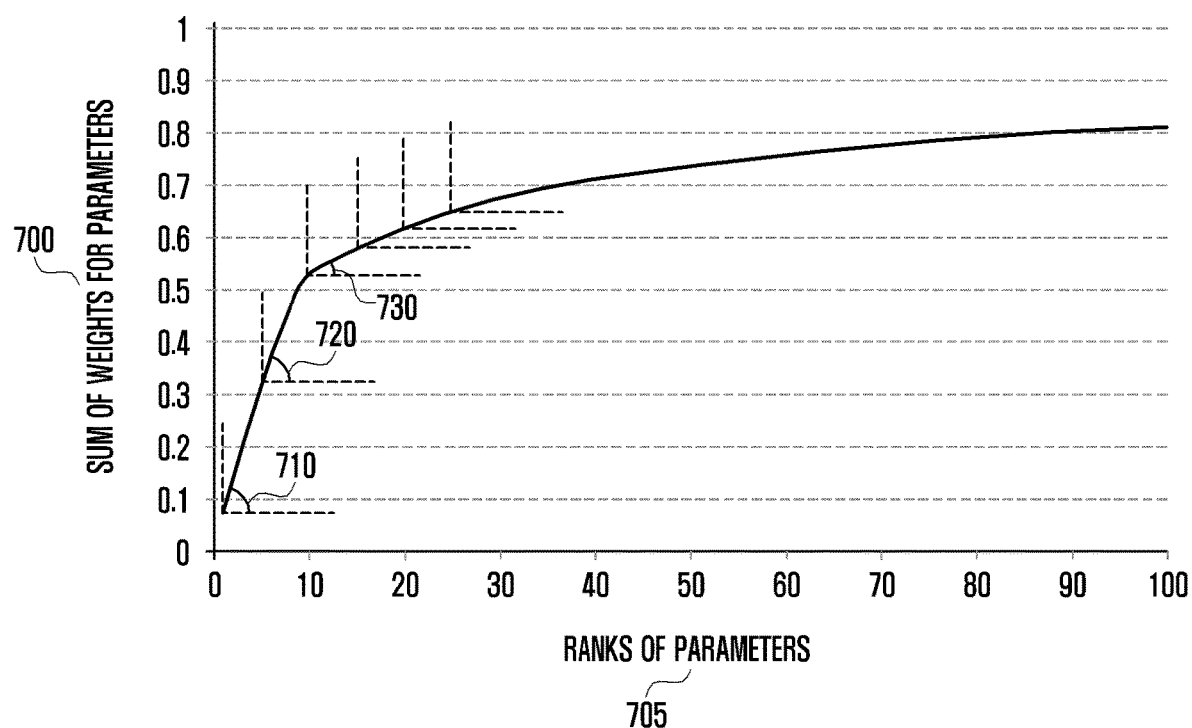
FIG. 7 shows a graph representing the state model that predicts the device state.

The parameter selector 333 may select a parameter to be shared with at least one remote device according to a preset criterion from among one or more parameters included in the state model generated by the modeling unit 310. Here, the parameter selector 333 can dynamically determine the number of parameters to be shared based on the weight and the accuracy of the state model. The accuracy of the state model indicates the degree of agreement between the predicted result calculated by entering the data log into the state model and the actual result, and can be included in the model related information. An example of the state model is shown in FIG. 7, and a more detailed description is given with reference to FIG. 8.

The prediction result determiner 335 may use both the prediction result calculated based on the state model generated by the modeling unit 310 of the local device and the prediction result calculated based on the state model generated in the remote device to produce a prediction result for the state of the local device. Also, the prediction result determiner 335 may use both the accuracy of the state model of the local device and the reliability of the state model of the remote device to produce a prediction result for the state. The accuracy and reliability of the state model indicate the degree of agreement between the predicted result and the actual result for an input value to the state model. In the description, the term "accuracy" is used for the state model generated in the local device, and the term "reliability" is used for the state model generated in the remote device. A detailed description is given of the prediction result determiner 335, which produces a prediction result based on the state model of the local device and the state model of the remote device, with reference to FIG. 10.

The configuration change determiner 337 may generate a feedback value using the prediction result and the reliability thereof produced by the prediction result determiner 335 and determine whether to change the configuration of the device based on the feedback value. A detailed description is given of determining whether to change the configuration of the device with reference to FIG. 11.

It is possible for the constituent modules of the control unit 330 to perform the above operations. However, it is well known in the art that the control unit 330 can directly perform all of the above operations.

The remote communication unit 340 may be connected to at least one remote device to share state related information and model related information with the remote device. More specifically, the remote communication unit 340 may transmit at least one remote device a parameter selected based on the state model. The remote communication unit 340 may transmit the weight information of the parameter and the accuracy information of the state model to the at least one remote device. That is, the remote communication unit 340 does not transmit a data log itself collected from the local device, but transmits the state related information, thereby consuming a smaller amount of resources.

Also, the remote communication unit 340 may receive state-related information and model-related information from at least one remote device. The control unit 330 may receive state related information and model related information through the remote communication unit 340 from the remote device, construct a model of the remote device based on the received information, and use the constructed model to produce a prediction result for the local device.

That is, the remote communication unit 340 may receive, from at least one remote device, model related information including a parameter selected based on the state model of the remote device and weight information of the selected parameter, and state related information including the reliability information of the state model.

The control unit 330 may finally produce an optimized device configuration 350 according to the predicted state of the device by using the constituent modules thereof.

The controller 330 may control generating a state model of the device based on state related data, selecting at least one parameter that determines the state of the device based on the generated state model, and transmitting the selected at least one parameter to at least one different device.

The control unit 330 may further control transmitting weight information corresponding to the selected at least one parameter to the different device. The control unit 330 may control transmitting only the parameter among the state related data and the parameter to at least one different device. The control unit 330 may control receiving, from at least one different device, at least one parameter, which determines the state of the different device and is selected based on the state model generated in the different device, and the weight information corresponding to the selected parameter, and producing a prediction result for the state of the device on the basis of at least one parameter determining the state of the device and at least one parameter determining the state of the different device.

The control unit 330 may control receiving, from at least one different device, information about the reliability of the prediction result derived from the state model generated in the different device. The control unit 330 may control producing a prediction result for the state of the device in consideration of the accuracy of the prediction result derived from the state model generated in the device and the reliability of the prediction result derived from the state model generated in the different device. In addition, the control unit 330 may control determining whether to change the configuration of the device based on the prediction result for the state.

Figure 4:
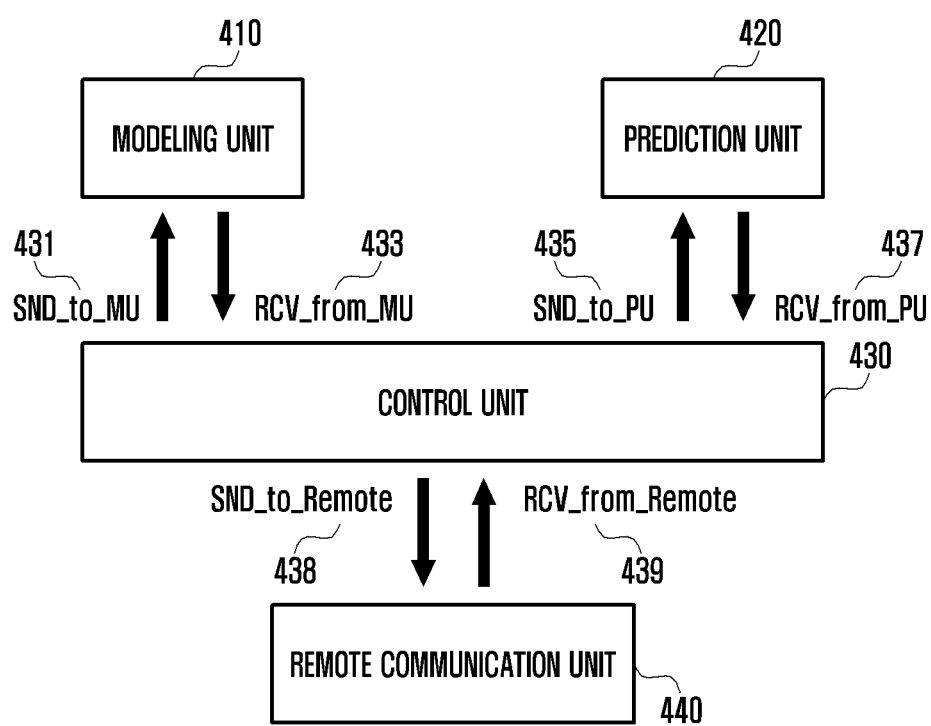
FIG. 4 illustrates pieces of information transmitted and received between the internal components of the device according to an embodiment of the present invention.

FIG. 4 illustrates pieces of information transmitted and received between the internal components of the device according to an embodiment of the present invention.

More specifically, the device may further include interface mechanisms for transmitting and receiving information between the modeling unit 410, the prediction unit 420, and the control unit 430.

First, the interface for transmitting information from the control unit 430 to the modeling unit 410 may be referred to as "SND_to_MU" 431. The control unit 430 may transmit data logs received from various sensors of the local device. Typically, the data log is streamed to the control unit 430 as an input value and processed through a pre-processing step. Pre-processing is not within the scope of the present invention and is not described herein. In addition, the control unit 430 may transmit state related information and model related information received through the remote communication unit 440. The state related information may include parameters selected based on the state model generated at the remote device and weights for the parameters. The model related information may include information regarding characteristics of data logs, algorithms, and parameters used to generate the state model. The model related information may also include information on the reliability of the state model. The modeling unit 410 can learn the data logs received from the local device to generate a state model. To generate the state model, the modeling unit 410 may additionally use the state related information and model related information received through the remote communication unit 440. The learning algorithms may include, for example, machine learning algorithms.

The interface for transmitting information from the modeling unit 410 to the control unit 430 may be referred to as RCV_from_MU 433. The modeling unit 410 may transmit the generated state model and model related information to the control unit 430. The control unit 430 may derive state related information from the state model. That is, the controller 430 may produce information on the parameters determining the state and the weight information for the parameters.

Next, the interface for transmitting information from the control unit 430 to the prediction unit 420 may be referred to as SND_to_PU 435. The control unit 430 may transmit a given amount or more of data logs at the present time for predicting the state of the device as part of SND_to_PU. The control unit 430 may transmit the state model received from the modeling unit 410, that is, a state model generated based on the data logs collected from the local device and a state model received from the remote device. Upon receiving new data logs at the current time point, the state models, and the state related information, the prediction unit 420 can produce a prediction result on the state by applying pre-stored algorithms to each state model. The algorithms may include, for example, machine learning algorithms.

The interface for transmitting information from the prediction unit 420 to the control unit 430 may be referred to as RCV_from_PU 437. The prediction unit 420 may transmit a prediction result for the state of the device when each state model is applied. Thereby, the control unit 430 can produce a prediction result for the state of the local device by using both the prediction result derived from the state model of the local device and the prediction result derived from the state model of the remote device.

Next, the interface for transmitting information from the control unit 430 to the remote communication unit 440 may be referred to as SND_to_Remote 438. The control unit 430 may send state related information to at least one remote device based on the state model received from the modeling unit 410 through continuous monitoring. The remote device may be a member of a group of devices having characteristics similar to the local device. The control unit 430 may select state related information based on the received state model and determine whether to transmit the state related information to the at least one remote device. This is described in detail with reference to FIG. 9.

The interface for transmitting information from the remote communication unit 440 to the control unit 430 may be referred to as RCV_from_Remote 439. The remote communication unit 440 may transmit state related information based on the state model generated in the remote device to the control unit 430. More specifically, the control unit 430 may receive parameters selected based on the state model and weight information indicating the degree to which the parameters determine the state. The control unit 430 may also receive information on the reliability of the state model generated at the remote device. The control unit 430 may calculate a prediction result for the state using the received state related information. This is described in detail with reference to FIG. 10. In addition, peer-to-peer (P2P) sharing schemes may be used as distributed algorithms for transmitting and receiving information through the remote communication unit 440 to and from other remote devices.

Figure 5A:
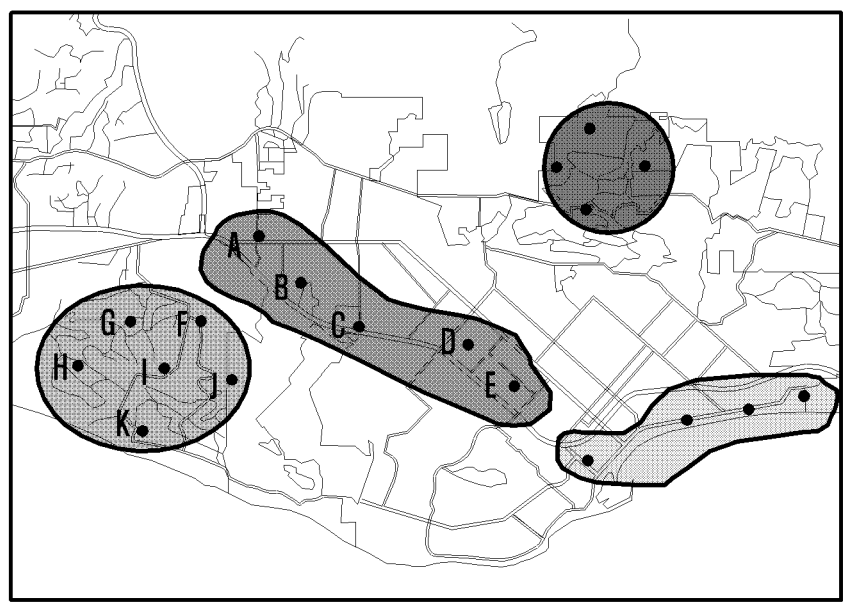

FIGS. 5A and 5B illustrate grouping of devices to share state related information according to an embodiment of the present invention.

More specifically, assuming that the device is a base station, FIG. 5A shows groups of base stations sharing state related information and model related information for the model on a map. A group of one or more devices may be referred to as a shared model group. FIG. 5B is a table showing attribute values of base stations. Base stations can be grouped based on the installation area, the software version, the number of assigned cells, and the like to create shared model groups.

Figure 6A:
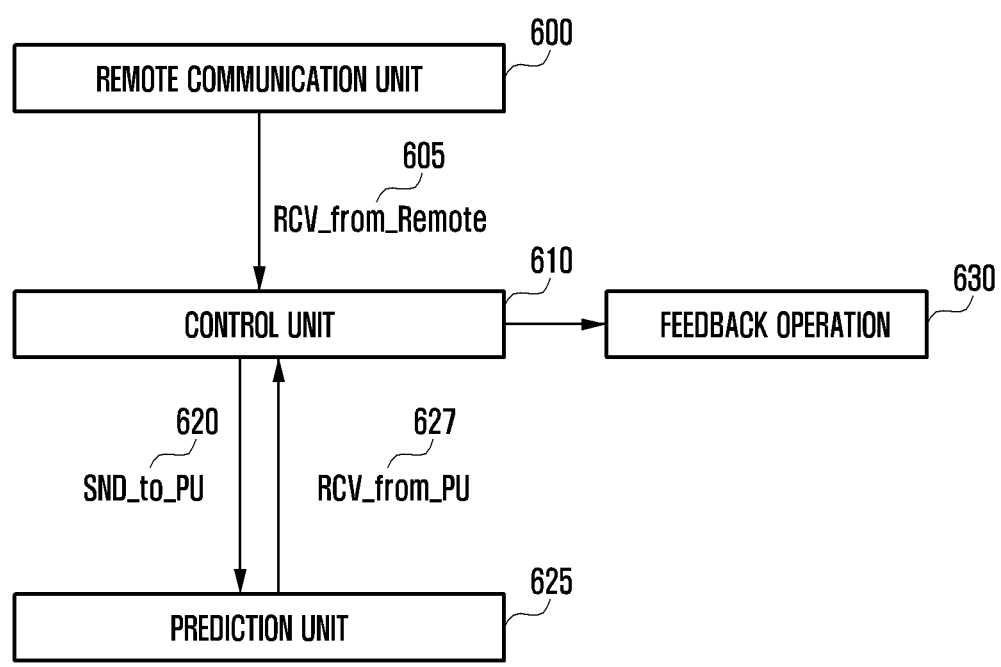
FIGS. 6A and 6B illustrate producing a prediction result for the device installation state and performing a feedback operation according to an embodiment of the present invention.
Figure 6B:
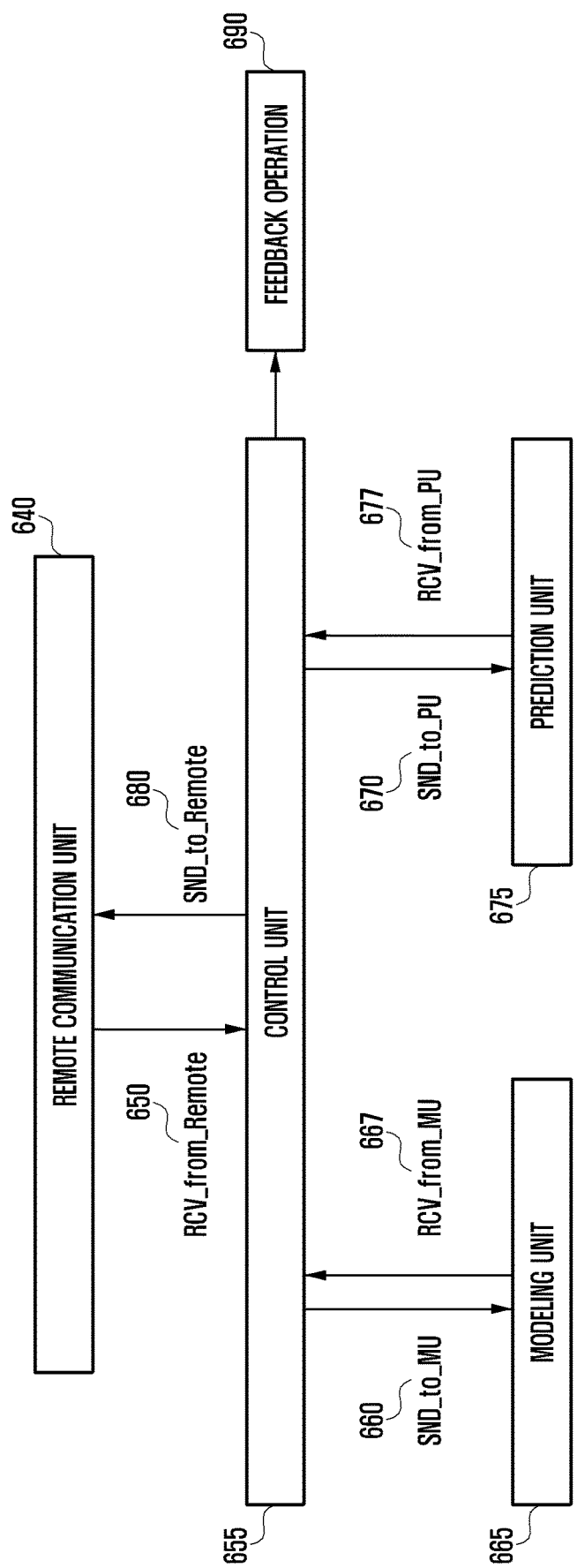

The group information can be determined by the base station management system based on the attribute values of the base stations as shown in FIG. 5B. For example, a k-mode clustering technique may be performed to group the base stations, and the information on the shared model groups may be notified to the base stations of the groups. Thereafter, the base stations belonging to the same shared model group may share state related information. FIGS. 6A and 6B illustrate producing a prediction result for the device installation state and performing a feedback operation according to an embodiment of the present invention.

More specifically, FIG. 6A illustrates operations between internal modules in a newly installed local device, and FIG. 6B illustrates operations between internal modules in a previously installed local device.

In the case of a newly installed local device of FIG. 6A, there are few or no accumulated data logs. Hence, the control unit 610 may receive the state related information and model related information through the interface connected to the remote communication unit 600 (RCV_from_Remote 605) from the remote devices belonging to the same shared model group, and produce a prediction result. That is, the control unit 610 can receive the state related information selected from the remote base station through the remote communication unit 600. The control unit 610 may transmit a new data log at the current local base station and the state related information received from at least one remote base station to the prediction unit 625 through SND_to_PU 620. The prediction unit 625 can produce a prediction result based on the received new data log at the current time point and the state related information of at least one remote base station, and transmit the prediction result back to the control unit 622 via RCV_from_PU 627. The control unit 610 can utilize the prediction result produced by at least one remote base station and the reliability of the state model at the remote base to produce a prediction result at the current time point in the local base station, and perform a feedback operation (630). The feedback operation may include determining whether to change the current configuration of the device.

In the case of a previously installed local device of FIG. 6B, there are accumulated data logs. Hence, the local device may share state related information derived from the state model generated based on the accumulated data logs therein with at least one remote device. In addition, the local device may produce a prediction result at the current time in the local device on the basis of the state related information received from the remote device and the state model generated in the local device.

First, a description is given of sharing state related information derived from the state model generated in the local device with at least one remote device. The control unit 655 can transmit the accumulated data logs to the modeling unit 665 via SND_to_MU 660. The modeling unit 665 can generate a state model based on the data logs and transmit the state model back to the control unit 655 via RCV_from_MU 667. The control unit 655 may transmit the state model generated based on the data logs to the prediction unit 675 through SND_to_PU 670. In this case, the control unit 655 may also transmit a new data log collected at the current time point. The prediction unit 675 can produce a prediction result based on the new data log and the state model.

The prediction unit 675 can transmit the prediction result to the control unit 655 via RCV_from_PU 677. The control unit 655 can compute the prediction accuracy of the state model on the basis of the prediction result derived from the state model generated based on the data logs of the local device. Obtaining the prediction accuracy is not within the scope of the present invention, and a description thereof is omitted. Based on the prediction accuracy of the state model, the control unit 677 may select parameters to be shared with the remote device from among the parameters included in the state related information of the state model, and determine whether to share the state related information of the state model. This is described in more detail with reference to FIG. 8. Upon determining to share the state model generated in the local base station and selecting the parameters to be shared among the state related information, the control unit 655 may transmit the selected parameters and weight information corresponding to the selected parameters to the remote communication unit 640 through SND_to_Remote 680.

Next, a description is given of producing a prediction result at the current time point in the local device based on the state model generated in the local device. The control unit 655 can receive state related information and model related information about the state model created in the remote device from the remote communication unit 640 via SND_to_Remote 680. The description on creating the state model and selecting the parameters to be shared in the local device is the same as that in the remote device. The control unit 655 may forward the state related information received from the remote device to the prediction unit 675 via SND_to_PU 670. At the same time, the control unit 655 can also transmit a certain amount of data logs collected by the local device up to the current time point.

The predicting unit 675 can produce a prediction result for the data logs at the current time point by using at least one parameter included in the state related information and a weight corresponding to the parameter. The prediction unit 675 can transmit the prediction result based on the state related information received from the remote device to the control unit 655 through RCV_from_PU 677. The control unit 655 can utilize both the prediction result based on the state model of the local device and the prediction result based on the state model of the remote device to produce the prediction result for the state of the local device. This is described in more detail with reference to FIG. 10. The control unit 655 may perform a feedback operation based on the produced prediction result (690). Specifically, the control unit 655 may determine whether to perform a feedback operation based on the prediction result.

FIG. 7 shows a graph representing the state model that predicts the device state.

More specifically, FIG. 7 illustrates a state model generated by the modeling unit based on data logs collected in the device. The device may select parameters to be shared with a remote device based on the state model. In the graph for the state model, the x-axis indicates the ranks of parameters (705) and the y-axis indicates the cumulative sum of weights of the parameters (700). The parameters refers to factors that determine the state of the device. For example, to make a prediction on the network throughput of the device, the parameters may include reference signal received power (RSRP), reference signal received quality (RSRQ), and channel quality indication (CQI).

In FIG. 7, the graph of cumulative weights of the parameters determining the state is in the form of a cumulative distribution function (CDF) graph. It can be seen that the slope of the graph decreases as the number of parameters is accumulated according to the order of weighting (710, 720, 730). The device may determine the number of parameters to be shared on the basis of the slope of the graph. This is described in more detail with reference to FIG. 8.

Figure 8A:
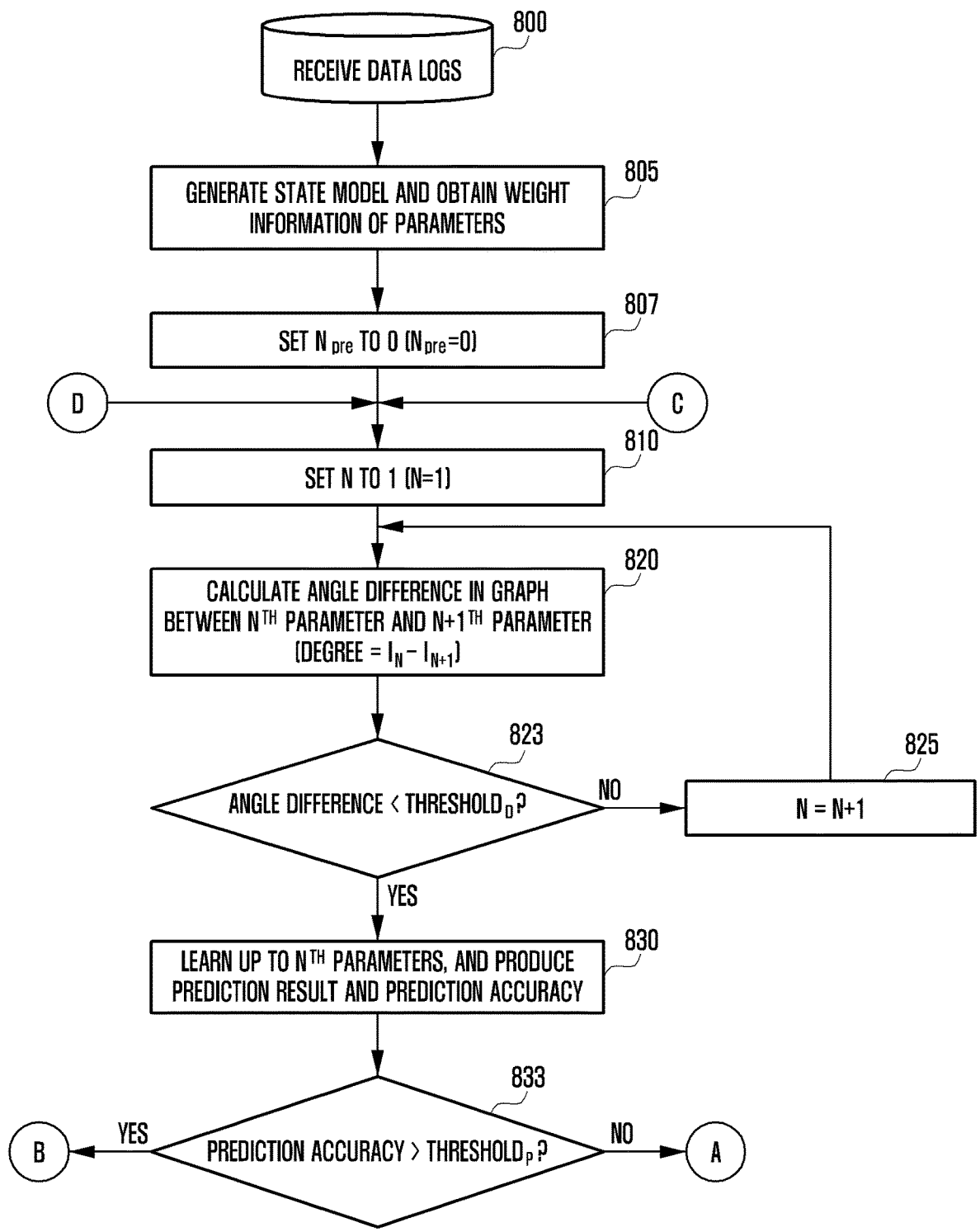
FIGS. 8A, 8B and 8C illustrate operations for selecting parameters to be shared with another device for a state model and determining whether to share the state model according to an embodiment of the present invention.
Figure 8B:
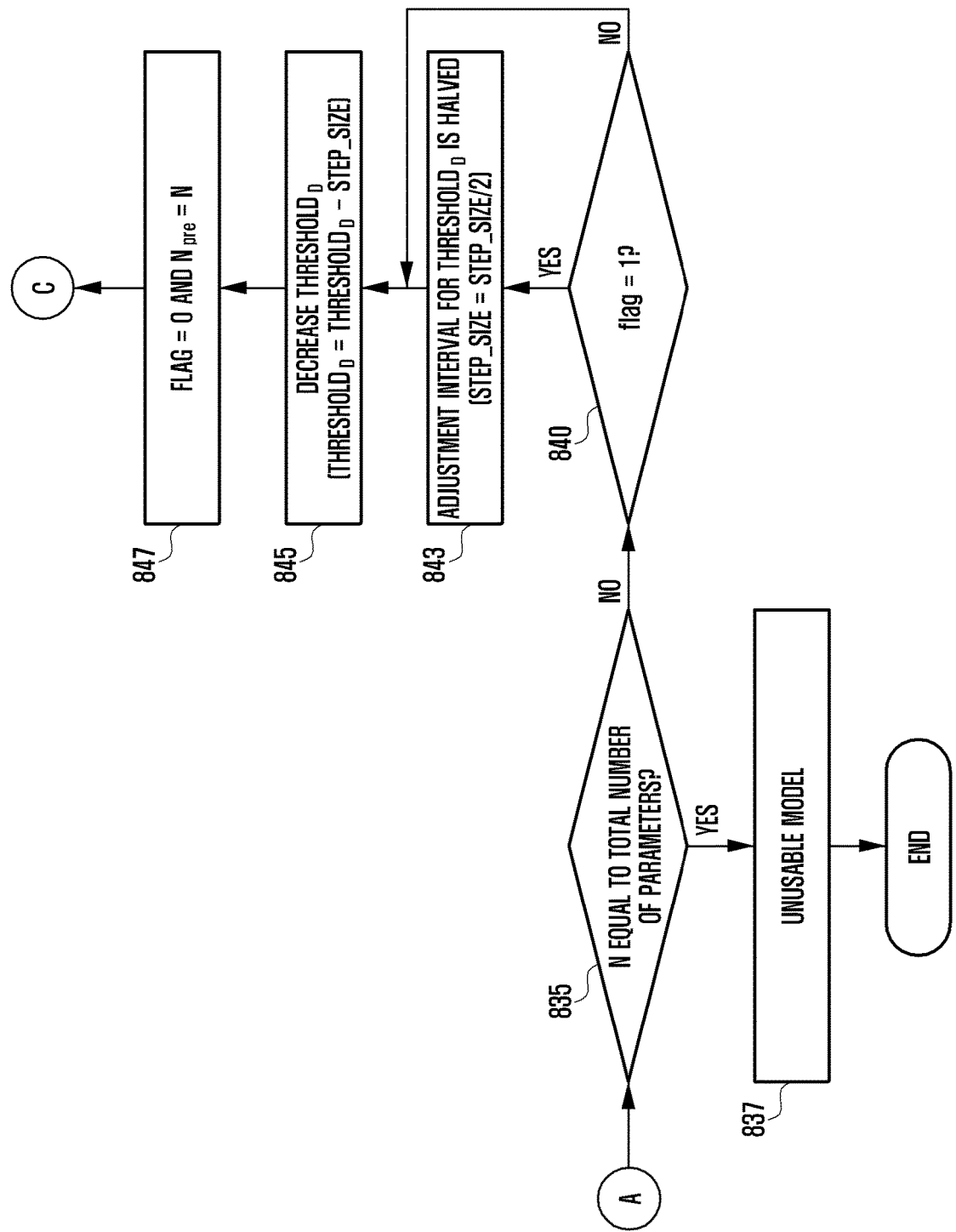
Figure 8C:
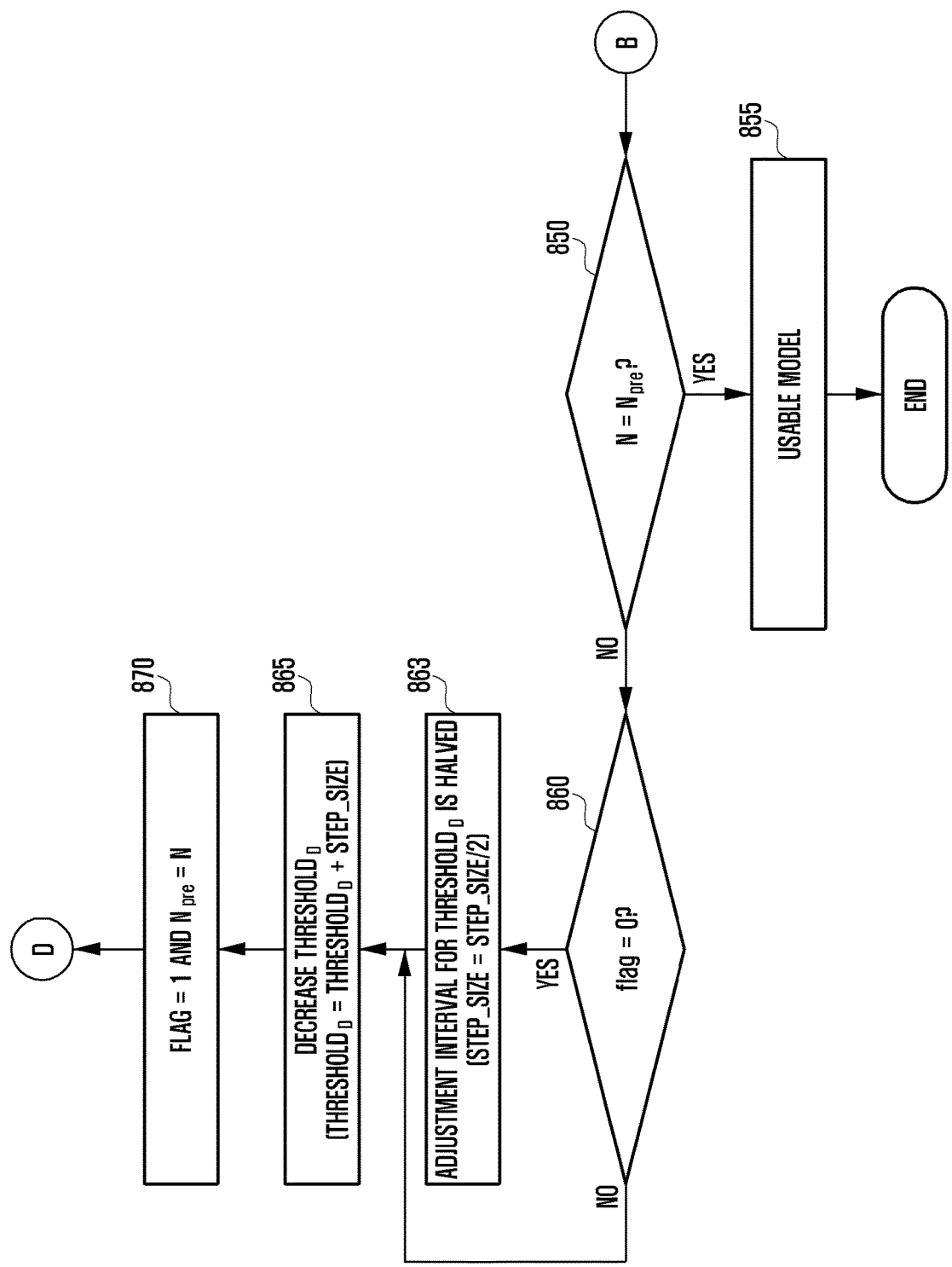

FIGS. 8A, 8B and 8C illustrate operations for selecting parameters to be shared with another device for a state model and determining whether to share the state model according to an embodiment of the present invention.

More specifically, the device may receive data logs associated with the state from the sensors (800). The device may generate a state model based on the data logs, and may identify parameters that determine the state according to the state model and weights of the parameters (805). Here, the state model may be the one shown in FIG. 7, and it is assumed in the following description that the state model is the same as the graph shown in FIG. 7.

The device may set $N_{pre}$ to 0 for N indicating the number of parameters (807). The device may set N to 1 (810). To compute the angle difference in the graph between the parameters of adjacent ranks, the device may calculate the angle difference in the graph between the $N^{th}$ parameter and the $N+1^{th}$ parameter (degree=$I_N - I_{N+1}$) (820).

The device may then determine whether the calculated angle difference is less than a preset threshold of the slope (threshold$_D$) (823). If the calculated angle difference is not less than threshold$_D$, the device may increase the number of parameters by one (825), and repeat steps 820 and 823. The device repeats steps 820 through 825 until the condition of step 823 is satisfied, and it can determine the number of parameters whose weight is greater than or equal to a preset value. If the calculated angle difference ($I_N - I_{N+1}$) is less than threshold$_D$, the device may learn the first to $N^{th}$ parameters to thereby produce the prediction result and the prediction accuracy (830). Thereafter, the device may determine whether the produced prediction accuracy is higher than a preset threshold of the prediction accuracy (threshold$_P$) (833). If the prediction accuracy is lower than threshold$_P$, the device may determine whether the value of N is equal to the total number of parameters (835). If N is equal to the total number of parameters, the device may determine the state model as unusable (837). That is, if the prediction accuracy is lower than threshold$_P$ although all the parameters in the state model are used for producing the prediction result, the state model is not shared with remote devices and is not used to make a prediction on the state in the local device.

If N is not equal to the total number of parameters, the device may determine whether flag is set to 1 (840). If flag is set to 1, the step size serving as the adjustment interval for threshold$_D$ can be halved (843). Otherwise, step 840 can be skipped. Here, the step size means the interval value that changes the number of parameters in order to identify the minimum number of parameters whose prediction accuracy satisfies threshold$_P$. Thereafter, the device may adjust threshold$_D$ downward by subtracting the step size from threshold$_D$ (845). This is to increase the number of parameters to be learned by lowering threshold$_D$ when the device has learned N parameters and produced a prediction result at step 830 with the prediction accuracy lower than threshold$_P$. Then, the device may set flag to 0 and set $N_{pre}$ to N (847).

Thereafter, steps 810 to 830 may be repeated to determine the number of parameters based on changed threshold$_D$.

On the other hand, if the prediction accuracy is higher than threshold$_P$ at step 833, the device may determine whether N is equal to $N_{pre}$ (850). If N is equal to $N_{pre}$, the device may determine the current state model as a usable state model (855). If N is not equal to $N_{pre}$, the device may determine whether flag is set to 0 (860). If the device initially tests step 833, $N_{pre}$ is 0 at step 850, which is the value set at step 807; the result of step 850 is always "no" even if the result exceeds the prediction accuracy in the first attempt at step 833; and the device may initiate learning again by decreasing the number of parameters through adjustment of threshold$_D$. If the device previously tested step 833 and passed the step 847 or 870, N$_{pre}$ is the number of parameters learned in the previous stage; and if N is equal to N$_{pre}$ at step 850 after adjusting threshold$_D$, that is, when the number of learned parameters equals the number of learned parameters in the previous stage, the device can determine the current state model as a usable state model.

Thereafter, if flag is set to 0 at step 860, the device may reduce the step size serving as the adjustment interval for threshold$_D$ by half (863). If flag is set to 1, the device can maintain the step size.

Thereafter, the device may adjust threshold$_D$ upward by adding the step size to threshold$_D$ (865). This is to decrease the number of parameters to be learned by increasing threshold$_D$ when the device has learned N parameters and produced a prediction result at step 830 with the prediction accuracy higher than threshold$_P$. Then, the device may set flag to 1 and set N$_{pre}$ to N (870). Thereafter, step 810 and subsequent steps may be repeated to determine the number of parameters based on changed threshold$_D$.

Here, flag is a criterion for determining whether the step size for adjusting threshold$_D$ is halved. When threshold$_D$ is adjusted downward, flag is set to 0 (847); and when threshold$_D$ is adjusted upward, flag is set to 1 (870). If flag is 1 before threshold$_D$ is adjusted downward, threshold$_D$ is adjusted upward. At this time, the step size is reduced by half. If flag is 0 before threshold$_D$ is adjusted upward, threshold$_D$ is adjusted downward. At this time, the step size is reduced by half That is, when the device adjusts threshold$_D$ differently from the previous stage, it can reduce the step size by half.

Through the above process, the device can select a minimum number of parameters reaching the desired prediction accuracy. For example, after selecting 50 parameters based on initially determined threshold$_D$ and learning, if the prediction accuracy satisfies threshold$_P$, threshold$_D$ is increased to reduce the number of selected parameters. Thereafter, the device may learn 45 parameters (excluding 5 parameters) based on upwardly adjusted threshold$_D$ and calculate the prediction result. If the prediction accuracy of the prediction result does not satisfy threshold$_P$, the device can select an increased number of parameters and learn again by adjusting threshold$_D$ downward.

Figure 9:
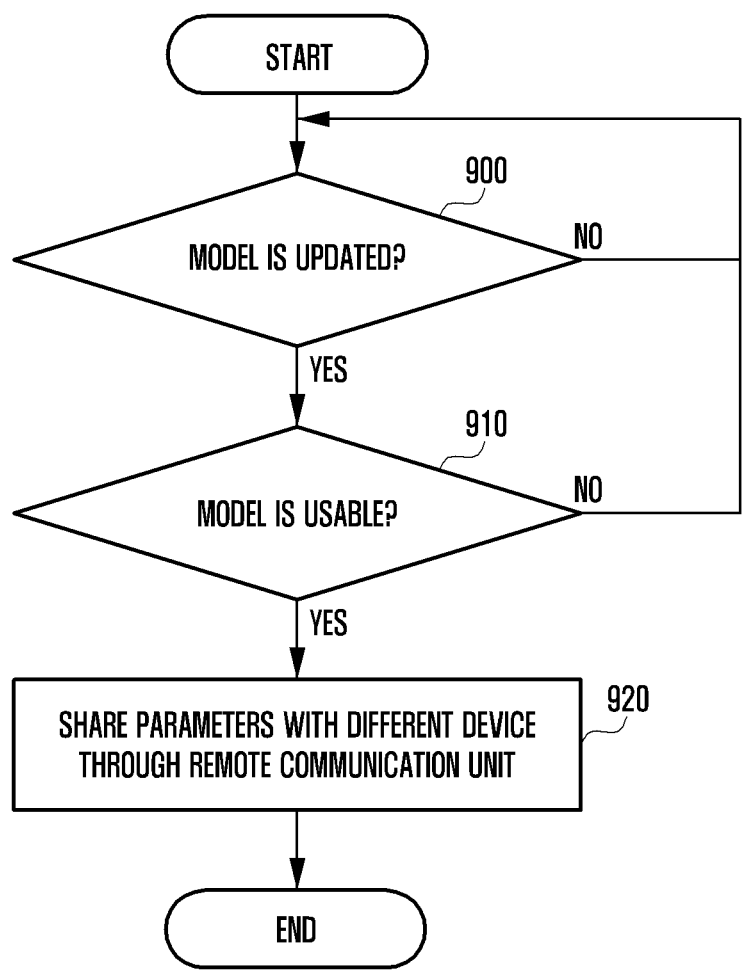
FIG. 9 illustrates the operation of determining whether to share state related information with another device according to an embodiment of the present invention.

FIG. 9 illustrates the operation of determining whether to share state related information with another device according to an embodiment of the present invention.

The device may determine whether the state model is updated (900). That is, the device can determine whether a new state model has been created using newly accumulated data logs. Thereafter, the device may determine whether the newly generated state model is a usable model (910). That is, the device can perform the operation described in FIG. 8 on the newly generated state model to determine whether it is a usable model. If the newly generated state model is not a usable model, it is not shared and the procedure proceeds to step 900, at which the device may check whether a new state model is generated. If the newly generated state model is a usable model, the device may share the parameters selected from the state model with a remote device via the remote communication unit (920).

Figure 10:
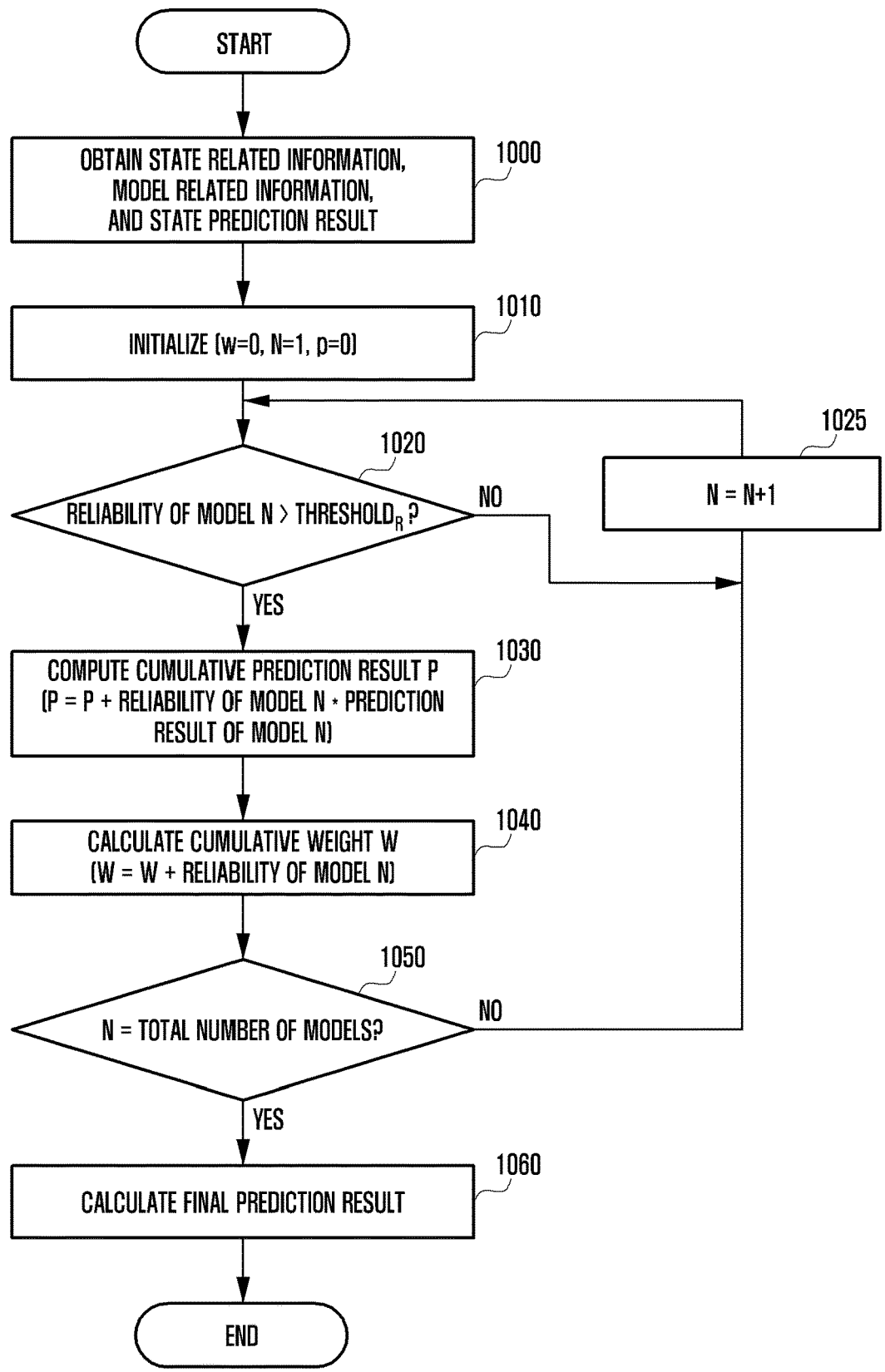
FIG. 10 illustrates an operation by which the device derives a prediction result based on state related information according to an embodiment of the present invention.

FIG. 10 illustrates an operation by which the device produces a prediction result on the state according to an embodiment of the present invention.

More specifically, the device can produce the final prediction result of the local device on the basis of the reliability or accuracy of the state models generated in the local device and the remote device. That is, a state model with a high reliability or accuracy has a large influence on the final prediction result, and a state model with a low reliability or accuracy has a small influence on the final prediction result. In addition, if the reliability of a state model does not exceed a preset threshold, it may be regarded as an inaccurate model and be not used for calculating the prediction result.

The device may obtain state related information, model related information, and state prediction results from the local device and the remote device (1000). The device may generate a state model based on locally collected data logs, and use the prediction unit to calculate a prediction result based on the state related information of the state model. In addition, the device may receive state related information of the state model generated in the remote device, and may use the prediction unit to calculate a prediction result based on the state related information of the remote device.

Then, the device may set initial values by setting w (cumulative weight) to 0, setting N (index of a state model) to 1, and setting p (cumulative prediction result) to 0 (1010). Among the state models generated in the local device and the remote device, the device may utilize a state model whose reliability is greater than threshold$_R$ (preset threshold for reliability) only. The device may determine whether the reliability (or accuracy) of model N is greater than threshold$_R$ (1020). If the reliability of model N is less than threshold$_R$, the device may increase the model index by one (1025) and may determine whether the reliability of the next model is greater than threshold$_R$ (1020).

If the reliability of model N is greater than threshold$_R$ at step 1020, the device may compute the cumulative prediction result p (1030). That is, p=p+reliability of model N*prediction result of model N. Thereafter, the device may calculate the cumulative weight w (1040). That is, w=w+reliability (accuracy) of model N.

Then, the device may determine whether the model index N is equal to the total number of models corresponding to the state related information obtained at step 1000 (1050). If N is less than the total number of models, the device may increase the model index by one (1025), and the procedure returns to step 1020 for the next model. Thereafter, if the cumulative prediction result p and the cumulative weight w are determined based on the reliability of all the models, the device may calculate the final prediction result using p/w (1060).

For example, assume that the reliability of [model 1, model 2, model 3] is [0.9, 0.2, 0.1] and that the prediction result is [0.3, 0.9, 0.8]. Assume that threshold$_R$ is 0.1. Here, model 1 has a reliability much higher than threshold$_R$, and it has a large influence on calculating the prediction result. Model 2 has a reliability a little higher than threshold$_R$, and it has a small influence on calculating the prediction result. Model 3 has a reliability not higher than threshold$_R$, and it has no influence on calculating the prediction result. In this case, the cumulative prediction result p may be computed as shown in Equation 1 below.

$$p=0.9\text{(reliability of model 1)}\times 0.3\text{(prediction result of model 1)}+0.2\text{(reliability of model 2)}\times 0.9\text{(prediction result of model 2)}=0.45 \quad \text{[Equation 1]}$$

The cumulative weight w may be computed as shown in Equation 2 below.

$$w=0.9\text{(reliability of model 1)}+0.2\text{(reliability of model 2)}=1.1 \quad \text{[Equation 2]}$$

Hence, the final prediction result (p/w) is 0.41.

As described above, the final prediction result is 0.41. It can be seen that model 1 with higher reliability than model 2 affects the prediction result and the final prediction result is closer to the prediction result (0.3) of model 1 than the prediction result (0.9) of model 2.

Figure 11:
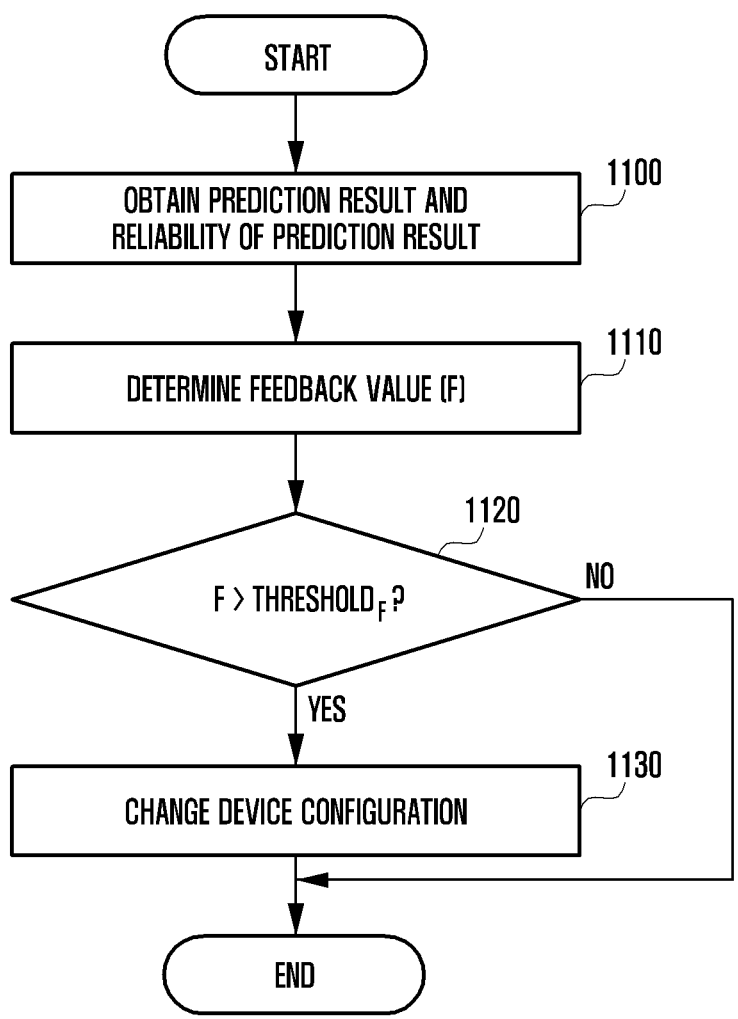
FIG. 11 illustrates a feedback operation performed by the device based on prediction results according to an embodiment of the present invention.

FIG. 11 illustrates a feedback operation performed by the device based on the prediction result according to an embodiment of the present invention.

The device can generate a feedback value using the state prediction result of the local device and the reliability of the prediction result in FIG. 10, and determine whether to execute the feedback operation using the feedback value. Whether to execute the feedback operation may include determining whether to change the configuration of the device.

More specifically, the device can obtain the state prediction result and the reliability of the prediction result of the local device derived as in FIG. 10 (1100). The reliability of the prediction result can be obtained by dividing the cumulative weight w by the number of models. Thereafter, the device may determine a feedback value f (1110). The feedback value f is a criterion value for the device to determine whether to perform the feedback operation. The device can determine the feedback value f using Equation 3 below.

Feedback value ($f$)=prediction result×reliability of prediction result+(1−prediction result)×(1−reliability of prediction result) [Equation 3]

The device may determine whether the determined feedback value f is greater than or equal to preset threshold$_f$ (1120). If the feedback value f is less than threshold$_f$, the procedure can be terminated without changing the configuration of the device. If the determined feedback value f is greater than or equal to threshold$_f$, the device may change the configuration of the device based on the feedback value f (1130).

For example, assume that the device is a base station and the failure state of a fan is to be predicted. When the prediction result for the failure of the fan is 0.9, the reliability of the prediction result is 0.8, and threshold$_f$ is 0.7, the feedback value f is given as follows.

$$f = 0.9*0.8 + (1-0.9)*(1-0.8)$$
$$= 0.74$$

As this value is greater than threshold$_f$, the device can determine that a fan failure will occur with a high probability and determine to change the hardware or software settings of the base station. By determining the feedback value using the reliability of the current prediction result, the device can predict and prepare for a more accurate state in real time.

The above-described method of sharing state related information including parameters selected based on the state model between devices having similar characteristics, and predicting the state of the local device based on the shared state related information can be applied as follows.

For example, to distribute network resources in real time by using the present invention, base stations installed in the same cell site, i.e., the same physical area, may monitor their available resources and terminal traffic. If the terminal traffic amount exceeds a given threshold, the base stations may perform resource migration. In this way, the base station can keep the quality of experience (QoE) of the user at a high level. By using the information about small states related to component resources of the base station, it is possible to predict and prepare for a large problem in advance while operating the network apparatus. As a result, it is possible to reduce the operation cost of the base station and to maintain the stability of the apparatus.

To optimize the power consumption of the base stations by utilizing the smart grid technology, the present invention can be utilized to introduce a rechargeable battery structure according to the peak/off-peak hours and the hourly power charges. More specifically, a parameter can be used for the number of terminals served per hour. In addition, parameters for physical resource block (PRB) usage amount, terminal data throughput, cell load, hardware component load, and backhaul load can be used. Additionally, parameters for the number of neighbor base stations can be used to account for the power consumed when the base station uses interference control modules. As the strength of a signal transmitted to the terminal can be influenced by the channel condition, parameters for the channel state can be used. The patterns of power consumption (voltage, ampere, ohm, interference) can be predicted based on the above parameters, and base station resources (radio power, frequency bandwidth) can be changed as needed based on the predicted power usage patterns. Hence, it is possible to operate fewer base stations, to reduce unnecessary facility investment, and to reduce the power operation cost as needed.

To optimize the network throughput performance of terminals, the base station may monitor radio information (e.g., reference signal received power (RSRP), reference signal received quality (RSRQ), channel quality indication (CQI)) and expected quality of experience (QoE). Thereby, performance of the terminals can be optimized through effectively allocated resources. Here, expected radio information and quality of experience (QoE) values of the terminals can be determined according to the billing plan, terminal type, and traffic pattern. For example, if the user subscribed to an expensive billing plan requires a terminal with a modem chipset supporting the high capacity downlink and a low latency application service, the base station can identify the available resources and the expected resources in the future in advance and perform resource migration to the base station with the highest performance.

To maintain the connectivity of the terminals, the high seamless handover rate, and high transparency, the present invention can be used for enabling the base stations connected with the terminals to predict software and hardware states. The base station may monitor the operation of various software modules and hardware modules internally (e.g., available resources and stability) and make a prediction on the normal operation. If a particular component exhibits an anomalous condition (e.g., optical error, communication error, memory error, fan error, memory full, CPU (central processing unit) full, DSP (digital signal processing) error), the base station can handover the terminals to a normally operating base station.

In the 5G communication system, a next-generation network becoming popular in recent years, to utilize network function virtualization (NFV) technology in conjunction with software defined networking (SDN) technology, the present invention may be applied to flexibly steering network traffic through the central SDN controller and to flexibly drive the apparatus resources as needed through NFV technology. For example, deep packet inspection technology installed on a base station may be used based on data logs for the parameters such as bandwidth, throughput, latency, jitter, and error rate between base stations. Thereby, the user application content and association patterns can be extracted. The extraction results can be sent to the SDN controller, which may result in higher user QoS and QoE and reduced operator capital expenditure and operational expenditure (CapEx/OpEx).

In the embodiments described above, all steps and messages may be subject to selective execution or may be subject to omissions. The steps in each embodiment need not occur in the listed order, but may be reversed. Messages need not necessarily be delivered in order, but the order may be reversed. Individual steps and messages can be performed and delivered independently.

Some or all of the table in the above-described embodiments is shown to illustrate embodiments of the present invention for facilitating understanding. Hence, the details of the table can be regarded as representing a part of the method and apparatus proposed by the present invention. That is, semantical approach to the contents of the table herein may be more desirable than syntactical approach thereto.

Hereinabove, various embodiments of the present invention have been shown and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents.

The invention claimed is:

1. A method of sharing state related information for a first device, the method comprising:
   receiving at least one data log;
   receiving, from a second device associated with the first device, state related information of the second device which is generated based on a state model of the second device;
   generating a state model of the first device based on the at least one data log and the state related information of the second device, the state model comprising information on parameters including weight information, which determine a state of the first device;
   selecting, based on the generated state model, at least one parameter of the parameters which determine the state of the first device based on the weight information; and
   transmitting, to at least the second device, the selected at least one parameter and the weight information corresponding to the selected at least one parameter.

2. The method of claim 1, wherein the at least one parameter is selected based on the weight information of parameters included in the state model and an accuracy of a state prediction result generated from the state model.

3. The method of claim 1, further comprising:
   receiving, from the second device, at least one second parameter, which determines the state of the second device and is selected based on a state model generated in the second device, and the weight information corresponding to the at least one second parameter; and
   generating a state prediction result for the first device based on the at least one parameter determining the state of the first device and the at least one second parameter determining the state of the second device.

4. The method of claim 3, further comprising:
   receiving, from the second device, information according to the reliability of a second state prediction result produced from the state model generated in the second device,
   wherein the state prediction result for the first device is generated based on an accuracy of the state prediction result produced from the state model generated in the first device and the received information according to the reliability of the second state prediction result.

5. The method of claim 3, further comprising determining whether to change the configuration of the first device based on the state prediction result.

6. The method of claim 1,
   wherein the second device is determined based on device attributes, and
   wherein the device attributes include at least one of the installation area, the software version, or the number of allocated cells of base stations.

7. The method of claim 1, wherein the state model of the first device includes information regarding at least one of power consumption of a base station, resource usage of a base station, abnormal operation of a base station, or performance of a terminal.

8. The method of claim 7, wherein, when the state model of the first device is a state model for the amount of power consumption of a base station, the at least one parameter includes information regarding at least one of a number of terminals served by the base station, data throughput of the terminal, a level of cell load, a load level of a hardware component, a level of backhaul load, a number of neighbor base stations, or channel conditions.

9. The method of claim 7, wherein the state model for abnormal operation of a base station includes information regarding at least one of communication errors, memory errors, fan errors, memory full errors, CPU full errors, or DSP (digital signal processing) errors.

10. The method of claim 7, wherein the performance of the terminal includes information regarding at least one of a reference signal received power (RSRP), a reference signal received quality (RSRQ), a channel quality indication (CQI), or a quality of experience (QoE).

11. The method of claim 1, further comprising:
    generating a state prediction result for the first device based on the at least one parameter of the first device.

12. A first device capable of sharing state related information, comprising:
    a transceiver configured to transmit and receive a signal; and
    at least one processor configured to:
       control the transceiver to receive at least one data log,
       control the transceiver to receive, from a second device associated with the first device, state related information of the second device which is generated based on a state model of the second device,
       generate a state model of the first device based on the at least one data log and the state related information received from the second device, the state model comprising information on parameters including weight information, which determine a state of the first device,
       select, based on the generated state model, at least one parameter of the parameters which determine the state of the first device based on the weight information, and
       control the transceiver to transmit, to at least the second device, the selected at least one parameter and the weight information corresponding to the selected at least one parameter.

13. The first device of claim 12, wherein the at least one processor is further configured to:
    generate a state prediction result for the first device based on the at least one parameter of the first device.

* * * * *